Oct. 3, 1950     G. C. SWENSON     2,524,406
REEL
Filed Jan. 23, 1946     2 Sheets-Sheet 1
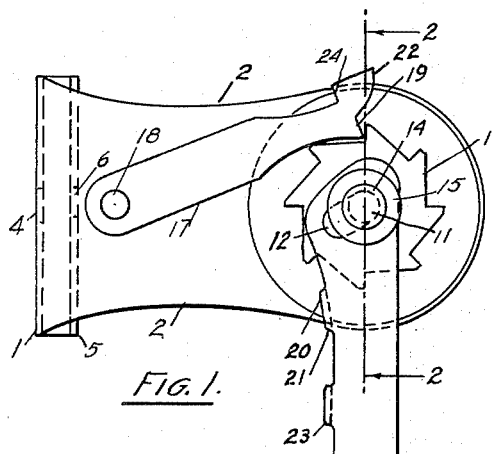
FIG. 1.
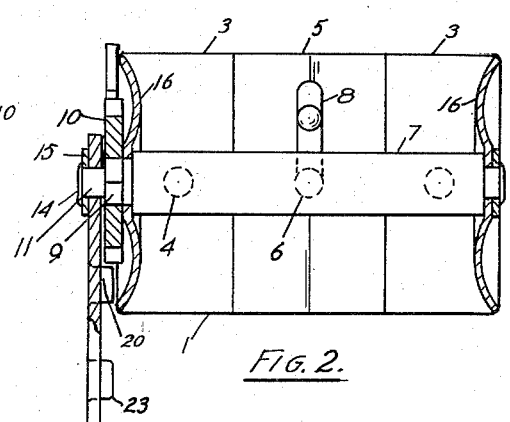
FIG. 2.
FIG. 3.
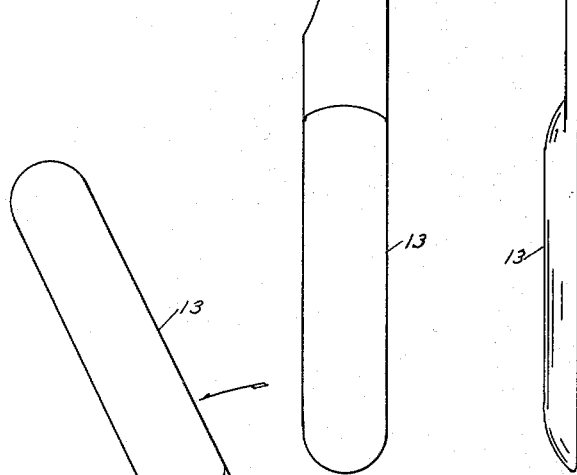
FIG. 4.
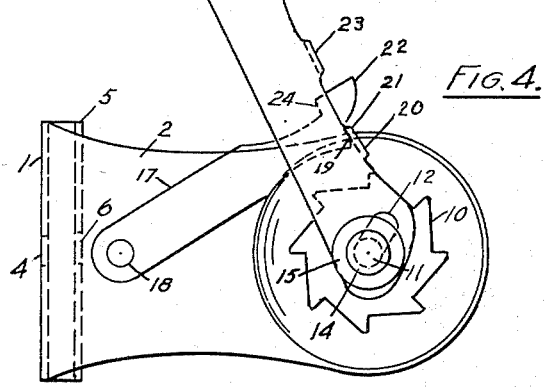
INVENTOR.
BY Gordon C. Swenson
Ralph Hammar
Attorney

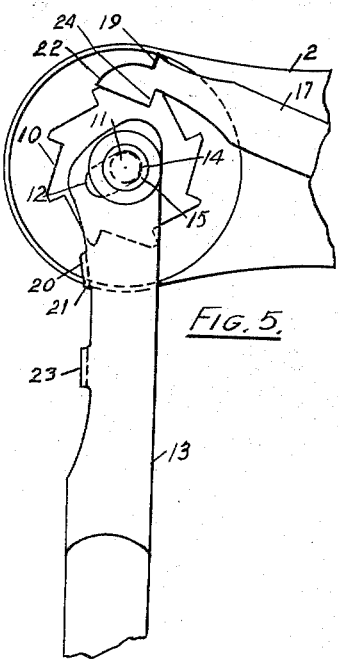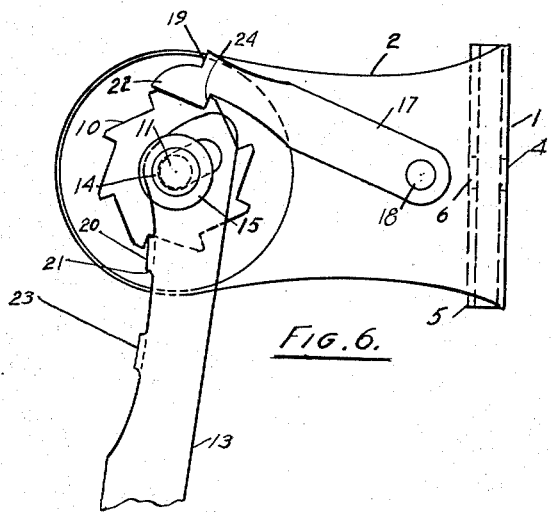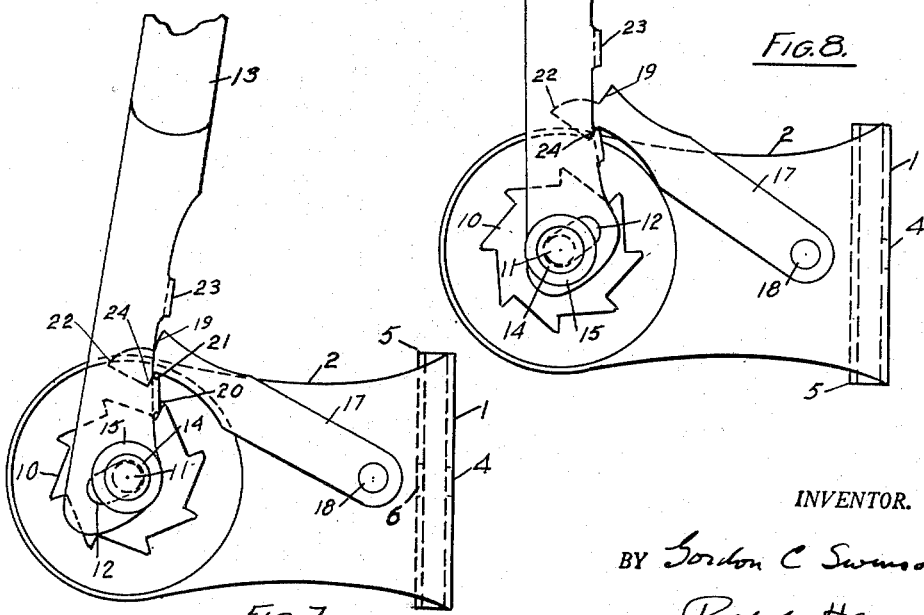

Patented Oct. 3, 1950

2,524,406

UNITED STATES PATENT OFFICE 2,524,406

REEL

Gordon C. Swenson, Erie, Pa.

Application January 23, 1946, Serial No. 642,797

2 Claims. (Cl. 254—164)

This invention is a reel for tightening clothes lines and the like. It has a pawl and ratchet for tightening the reel and an operating lever cammed into and out of cooperation with the ratchet by the normal operating forces on the lever. The lever is also usable to trip the pawl.

In the drawings, Fig. 1 is a side elevation of a reel embodying my invention; Fig. 2 is a sectional view on line 2—2 of Fig. 1; Fig. 3 is a perspective of the spool; Fig. 4 is a side view showing the tripping of the pawl; Fig. 5 is a side view of the reel arranged for operation by turning in the opposite direction; Fig. 6 is a side view illustrating the position of the lever while the ratchet is being turned; Fig. 7 is a view illustrating the position of the lever just prior to tripping the pawl; and Fig. 8 is a similar view showing the position of the lever after tripping the pawl.

Referring to the drawings, there is shown a bracket having a base 1 with forwardly projecting arms 2 at each end. Adjacent each of the arms is a flat portion 3 on the base having a screw hole 4. At the center the base is bent inwardly to form a shallow V 5 having a screw hole 6 at the bottom of the V. With this construction the bracket may be mounted on a post by a single screw which wedges the sides of the V tightly against the post. Journaled between the outer ends of the arms 2 is a spool 7 having a hook 8 for connection with the line. A spool shaft projects through one of the arms and has a squared portion 9 fitting in the hub of a ratchet 10 and a forward projecting cylindrical portion 11 received in a cam slot 12 in the end of an operating lever 13. The extreme end of the cylindrical portion is upset at 14 to hold a washer 15 which loosely retains the lever between the washer and the ratchet. As the ratchet is oscillated there will be a slight friction between the lever and either the washer or ratchet.

Around the spool the arms are dished to provide guards 16 which keep the clothes line away from the ends of the spool and also stiffen the arms. Backward or unwinding movement of the spool is prevented by a pawl 17 pivoted at 18 and having a tooth 19 at its outer end biased by gravity against the ratchet. When mounted in the position shown in Figs. 1 to 4, the spool is turned in the direction to tighten the line by clockwise movement of the lever. Upon counterclockwise or backward movement of the lever the force exerted on the lever moves the lever so that the projection 11 rests at the right hand end of the slot as viewed in Fig. 1. Upon clockwise or tightening or forward movement the lever slides on the projection 11 so that the projection rests at the left hand end of the slot. The slot is inclined with respect to the lever so that upon the clockwise or forward movement a dog 20 on the lever is moved inward so as to engage the ratchet. Upon reverse or backward movement of the lever the dog is moved outward or clear of the ratchet. An inclination of about thirty degrees with respect to a line perpendicular to the center line of the lever has been found to produce the necessary camming action so that upon forward or tightening movement of the lever the dog engages the ratchet and upon reverse or backward movement is disengaged from the ratchet. To release the spool the lever is moved backward to the position shown in Fig. 4 in which the upper edge 21 of the dog engages a nose 22 on the pawl and lifts it clear of the ratchet. In this position a stop 23 on the lever is over the nose of the pawl and limits the movement of the pawl as it snaps out of engagement with the ratchet.

Figs. 5 to 8 show the operation of the reel when mounted so that the tightening of the line is accomplished by pulling upward on the outer end of the lever 13 instead of pulling downward as is the case when the bracket is mounted as shown in Figs. 1 to 4. When mounted as shown in Figs. 5 to 8, a hook 24 on the opposite side of the pawl 17 is biased by gravity into engagement with the ratchet. The upward pull on the lever 13 cams the lever to the position shown in Fig. 6 in which the dog 20 engages the ratchet. Upon downward movement the lever is cammed to the position shown in Fig. 5 in which the dog is clear of the ratchet.

The tripping of the pawl is accomplished by first moving the lever to the position shown in Fig. 7 in which the hook 24 of the pawl is hooked over the upper edge 21 of the dog 20. By pulling forward on the upper end of the lever, the lever pivots about the hook 24 and exerts a camming force on the inclined slot which cams the dog 20 away from the ratchet. In this position the stop 23 is over the nose 22 of the pawl so as to limit movement of the pawl as it snaps out of the ratchet. Since the pawl is effectively held by engagement with the upper edge 21 of the dog 20, the stop may not be necessary.

What I claim as new is:

1. In a reel, a bracket having spaced arms, a spool between and having a shaft journaled in the arms, a ratchet on the shaft adjacent one arm, a pawl on said one arm engageable with the ratchet to prevent backward movement of the ratchet, a lever having a dog engageable with the ratchet, a cam slot in the lever inclined at an angle of less than 45° with respect to a line perpendicular to the center line of the lever cooperating with the shaft to cam the dog into and out of engagement with the ratchet upon forward and backward movement of the lever, a nose on the pawl engaged by said lever to trip the pawl upon extreme backward movement of the lever, and a stop on the lever over the nose upon extreme backward movement of the lever and limiting movement of the pawl upon tripping.

2. In a reel, a bracket having spaced arms, a spool between and having a shaft journaled in the arms, a ratchet on the shaft adjacent one arm, a pawl on said one arm engageable with the ratchet to prevent backward movement of the ratchet, a lever having a dog engageable with the ratchet, a cam slot in the lever inclined at an angle of less than 45° with respect to a line perpendicular to the center line of the lever cooperating with the shaft to cam the dog into and out of engagement with the ratchet upon forward and backward movement of the lever, and a hook on the pawl adapted to engage said ratchet or said dog when said dog is moved under the pawl upon forward movement of the lever.

GORDON C. SWENSON.

REFERENCES CITED

The following references are of record in the file of this patent:

UNITED STATES PATENTS

| Number | Name | Date |
|---|---|---|
| 258,634 | Eastabrooks | May 30, 1882 |
| 745,013 | Heisey | Nov. 24, 1903 |
| 1,003,333 | Campbell | Sept. 12, 1911 |